United States Patent [19]

Linke et al.

[11] 4,233,240

[45] Nov. 11, 1980

[54] STABILIZATION OF ACRYLAMIDE SOLUTIONS

[75] Inventors: William F. Linke; William F. Marzluff, both of Stamford, Conn.

[73] Assignee: American Cyanamid Company, Stamford, Conn.

[21] Appl. No.: 768,248

[22] Filed: Feb. 14, 1977

[51] Int. Cl.$^3$ .............................................. C08K 3/10
[52] U.S. Cl. ........................................................ 564/4
[58] Field of Search ................................... 260/561 N

[56] References Cited

U.S. PATENT DOCUMENTS

| 3,028,426 | 4/1962 | Porret et al. | 260/561 N |
| 3,329,715 | 7/1967 | Strohmeyer et al. | 260/561 N |
| 3,911,009 | 10/1975 | Yoshimura et al. | 260/561 N |

FOREIGN PATENT DOCUMENTS

| 389267 | 6/1963 | Japan. |
| 1404798 | 9/1965 | United Kingdom. |
| 1122112 | 7/1968 | United Kingdom. |
| 1174858 | 12/1969 | United Kingdom. |

*Primary Examiner*—Arthur P. Demers
*Attorney, Agent, or Firm*—Gordon L. Hart

[57] ABSTRACT

Acrylamide aqueous solutions when stored in closed containers without constant supply of oxygen as polymerization inhibitor will polymerize during storage. To extend the safe period of storage under these conditions, cupric ion at concentrations from 0.5 to about 10 parts per million parts acrylamide in the solution is used as a polymerization inhibitor.

1 Claim, No Drawings

STABILIZATION OF ACRYLAMIDE SOLUTIONS

The invention relates to acrylamide monomer solutions and particularly to the use of cupric ion in said solution to inhibit polymerization of the monomer.

The most effective inhibitor of polymerization in aqueous acrylamide solutions during storage has been a constant supply of oxygen to the solution. It is also known to use cupric ion in acrylamide aqueous solutions to inhibit polymerization. This inhibitor is used by adding a water-soluble cupric salt such as cupric sulfate, acetate, chloride or the like to the aqueous solution. Cupric ion is a convenient inhibitor for this use because it can be easily added in measured amounts, it does not evaporate, and it can be easily removed by ion-exhange when the solution is to be used for polymerization reactions.

It is found that small amounts of cupric ion present in the solution at concentration in the range from about one-half to about ten parts copper per million parts acrylamide in the solution are the most effective amounts for inhibiting polymerization during storage of such solutions in the absence of a supply of fresh oxygen. Solutions containing cupric ion in those ranges can be stored for safe periods longer than the safe periods for storage of solutions having even greater concentrations of cupric ion in the solution. Accordingly, the invention provides an optimum range of concentrations of cupric ion in acrylamide solutions which will afford the maximum protection against polymerization during storage of such solutions without a supply of oxygen.

The formation of acrylamide polymers in aqueous acrylamide solution is a major problem in the storage of such solutions. The polymerization reaction is exothermic, causing a rise of the solution temperature as the reaction proceeds. This increase of temperature increases the reaction rate and thus accelerates the polymerization which in turn releases heat faster. It is impossible for a closed drum of acrylamide solution in storage to explode from the pressure generated by a runaway polymerization reaction.

In a series of several tests, 50% aqueous solutions of acrylamide were prepared and some were stored in closed containers at each of several constant temperatures selected in the range from 25° C. to 100° C. At each test temperature, each of the several test solutions contained cupric ion present as copper sulfate in solution at a different level of concentration selected in the range from 0.5 to 30 parts copper per million parts acrylamide in the solution. A control solution at zero copper concentrations was also stored in a closed container at each temperature. The tests were controlled to determine the effectiveness of the copper ion at the several different concentrations for inhibiting polymerization. The containers were all closed during storage with only a small air volume at the top inside of each container so that the available oxygen was not a significant variable in the tests. The test conditions simulated actual storage of the solutions in closed drums or other closed containers. It was completely unexpected that most effective copper concentrations for this use were those below 10 ppm. The stored samples were visually monitored daily. When polymerization began in a sample it would progress rapidly and either the solution would become very viscous with soluble polymer, and/or a white "popcorn" precipitate of insoluble polymer would appear in the solution. These changes were both easily observed by the daily visual inspection of the solutions. The number of days passed before polymerization was observed in each sample was recorded.

All of the samples containing 0.5-30 ppm when stored at 25° C. and 40° C. had storage stabilities beyond 270 days, and the test was not carried out for a long enough time to determine the optimum cupric ion level for maximum stability at these temperatures. The control samples containing no copper ion all lasted more than 40 days and less then 50 days before polymerizing at 25° C. and 40° C.

At 60° C. the advantage of using cupric ion concentrations in the range from 0.5 to 10 ppm was noticeable. Samples containing no copper and those containing 20 ppm and 30 ppm copper were found to polymerize in 20 days or less at 60° C. while those containing 10, 5, 2, and 0.5 ppm copper, all remained unpolymerized at the end of 150 days.

At 80° C. all of the samples polymerized within 20 days. At zero copper concentration, 80° C., the control samples polymerized at less than one day for one sample and in less than four days for the other under the test conditions. At 0.5 ppm, copper concentration the sample lasted 10 days and 12 days respectively at 80° C. At 2 ppm the samples lasted 16 and 20 days at 80° C. Finally, at 5 ppm and 10 ppm the samples lasted three to four days, indicating an optimum concentration between 0.5 and 5 ppm copper at 80° C. to obtain maximum storage time under the test conditions.

At 100° C. the samples all polymerized within two days but samples having 0.5 and 2 ppm copper lasted from 1.1 to 1.9 days while those samples having no copper and those having 5 ppm copper all polymerized within 17 hours.

The foregoing tests demonstrate a previously unrecognized optimum concentration of cupric ion in acrylamide aqueous solutions, for inhibiting polymerization in such solutions under the test conditions. This optimum occurs at a value between about 0.5 and 10 parts copper per million parts acrylamide in the solution and is effective for prolonging storage life to a maximum when the solutions are stored in closed containers without a continuous supply of oxygen to the solutions.

While it is still preferred to store acrylamide aqueous solution with a constant supply of oxygen to the solution, when available, the invention provides improved inhibitors of polymerization in such solutions for limited periods of storage when the solutions cannot be supplied with oxygen. For example, when shipping acrylamide aqueous solution in closed drums, the use of cupric ion at or near the optimum concentration in the range from about 0.5 to about 10 ppm copper can provide adequate protection from polymerization for several days shipping time, even if extreme high ambient temperatures should be encountered in shipping. The use of higher copper concentrations have been shown to be less effective for this purpose than the concentrations within the range described.

We claim:

1. In storing acrylamide aqueous solution in a closed container without a continuous supply of oxygen to said solution, using cupric ion present as a copper salt in said solution to inhibit polymerization of acrylamide in said solution during storage, the improvement wherein the concentration of cupric ion is in the range from about 0.5 to about 10 parts copper per million parts acrylamide in said solution.

* * * * *